United States Patent Office 3,030,403
Patented Apr. 17, 1962

3,030,403
PROCESS OF MAKING CYANOALKYLSILANES
Roscoe A. Pike, Grand Island, N.Y., assignor to Union Carbide Corporation, a corporation of New York
No Drawing. Filed Dec. 30, 1959, Ser. No. 862,747
6 Claims. (Cl. 260—448.2)

This invention is directed to a process for making cyanoalkylsilanes containing three hydrolyzable groups attached to silicon and a cyano group interconnected to silicon through at least two carbon atoms of an alkyl group of two or more carbon atoms. More particularly, this invention relates to a process involving the reaction of alkene nitriles with silanes having hydrogen and three hydrolyzable groups attached to silicon in the presence of a silyl amine catalyst.

It has heretofore been shown that when acrylonitrile is reacted with a silane having a silanic hydrogen the silyl group of the silane bonds to that carbon atom of the two olefinic carbon atoms which is interconnected to the cyano group through the lesser number of carbon atoms and the silanic hydrogen bonds to that carbon atom of the two olefinic carbon atoms which is interconnected to cyano group through the greater number of carbon atoms. The reaction taking place, for example, between acrylonitrile and trichlorosilane, is represented by the equation:

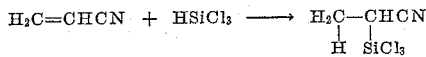

The process of this invention comprises reacting an alkene nitrile with a silane having one hydrogen and three hydrolyzable groups bonded to silicon in the presence of a silyl amine of the formula:

$$R'_{4-y}Si(NHR)_y$$

wherein R' is a monovalent hydrocarbon group or an alkoxy group and need not be the same throughout the same molecule, R is hydrogen, a monovalent hydrocarbon group or a monovalent chlorohydrocarbon group and y is an integer from 1 to 4. Thus, included as silyl amine catalysts are the N-alkylaminotrialkylsilanes (represented by the above formula where R' and R are alkyl) and the N-chloroarylaminotrialkylsilanes (represented by the above formula where R' is alkyl and R is chloroaryl). Examples of secondary silyl amines are $(CH_3)_3SiNH(CH_2)_5CH_3$, $(C_6H_5)_2Si(NHC_4H_9)_2$,
$C_2H_5Si(NHC_6H_5)_3$, $(CH_3)_3SiNHC_6H_4Cl$,
$(C_2H_5)_2Si(NHC_6H_4Cl)_2$, $Si(NHCH_3)_4$ and the like. Methods for preparing these amines are known in the art. In general they are prepared by reacting a silane having at least one silicon-bonded halogen atom with preferably at least two moles of a primary aliphatic hydrocarbon amine for each mole of silicon-bonded halogen desired to be displaced in a suitable solvent, such as petroleum ether or isopropyl ether, at atmospheric pressure and room temperature. Cooling, as by an ice bath, is employed when the temperature of reaction increases much above room temperature. The reaction forms the silyl amine and an amine hydrohalide. The silyl amines are isolated by filtering out the amine hydrohalide and distillation of the resulting filtrate through a packed column.

In carrying out the process of this invention the silyl group of the silane starting material bonds to that carbon atom of the two olefinic carbon atoms of the alkene nitrile starting material which is interconnected to the cyano group through the greater number of carbon atoms and the silanic hydrogen atom of the silane starting material bonds to that carbon atom of the two olefinic carbon atoms of the nitrile starting material which is interconnected to the cyano group through the lesser number of carbon atoms. The reaction taking place is represented by the following equation wherein acrylonitrile is employed as exemplifying the alkene nitrile starting material and $HSiX_3$ (X being a hydrolyzable group) represents the silane starting material:

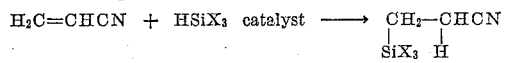

The process is carried out by forming a mixture of the alkene nitrile, the silane ($HSiX_3$) and the amine catalyst and heating the mixture to a temperature sufficiently elevated to bring about reaction of the nitrile and silane. When either one or both of the starting materials are gaseous at the reaction temperature a closed system, in accordance with techniques commonly employed in the art to maintain the concentrations of the starting materials at sufficient levels for providing the intimate reactive contact necessary for reaction, can be used. The process is advantageously carried out in pressure vessels or bombs in order to facilitate observation and favor closer control of reaction conditions, particularly when the one or both of the starting materials is gaseous at the reaction temperature. Continuous process systems can also be employed in carrying out the process.

Catalyst concentration is not narrowly critical and can be varied over a wide range. Thus, as little as 0.5 weight percent and as much as 10 weight percent of catalyst based on the combined weights of the starting materials are advantageously employed. Catalyst concentrations outside of this range are operable in the process but do not provide any additional advantage. A preferable catalyst concentration range has been found to be 1.6 to 2.5 weight percent based on the combined weights of the starting materials.

Equimolar or stoichiometric amounts of the starting materials have been found to be entirely suitable in the process. An excess of one or the other starting material over the stoichiometric amount can also be employed but no commensurate gain is obtained thereby. A useful range of amounts of starting materials is about one-half to two moles of the alkene nitrile per mole of the silane.

The temperatures employed in the process can be varied over a wide range from 50° C. to 250° C. Temperatures outside this range can be employed, if desired, but to no noticeable advantage. Within this temperature range reaction times vary from one-half to ten hours. Reaction times of one to about three hours are advantageously used when the process is conducted at temperatures in the range of 115° C. to 170° C.

The mixture resulting after completion of the reaction contains the cyanoalkylsilane product, some unreacted nitrile and silane starting materials and other materials mainly believed to be polymeric substances. The cyanoalkylsilane product is advantageously recovered from this mixture by fractional distillation, preferably under reduced pressure. Other means of recovery are within the skill of workers in the art and can be employed. When fractional distillation is employed for recovery, the cyanoalkylsilane product is obtained as a cut or series of cuts as its characteristic boiling point under the distillation pressure employed. Other high boiling materials such as unreacted starting materials are removed as a series of cuts and a residue or heavies remain in the still pot. These heavies are believed to be various polymerization materials of the alkene nitrile and the silane starting material and represent a loss of starting material. It has been found that the amount of heavies resulting from the process can be greatly reduced by adding to the initial reaction mixture difunctional silanes of the formula $RSiHX_2$ (X being a hydrolyzable group and R being a monovalent hydrocarbon group). These difunctional silanes were found not to react with the alkene nitriles. Higher yields thus can be obtained by employing such difunctional silanes and longer reaction times or higher temperatures or, alternatively, the starting materials saved from polymerizing can be recovered and reused to provide a substantial economy. A polymerization inhibitor known in the art to inhibit the polymerization of the alkene nitrile also can be used and thus reduce the amount of heavies obtained. Such polymerization inhibitors are 2,6-di-t-butylparacresol, hydroquinone, t-butylcatechol, t-butyl-4-methylphenol and the like.

The alkene nitriles used as starting materials in the process are known in the art. The alkene nitriles are represented by the formula, alkenyl-CN, and include acrylonitrile, methacrylonitrile, crotononitrile, allyl cyanide, methallyl cyanide, 1-cyano-4-pentene, 1-cyano-3-butene, 1-cyano-1-hexene and the like.

The silane starting materials are also known and are represented by the formula:

$$HSiX_3$$

wherein X represents a hydrolyzable group including alkoxy, aryloxy, acetoxy, halogen and the like. Preferred silane starting materials are the halosilanes and alkoxysilanes as shown by the formula wherein X is halogen or alkoxy. Illustrative of these silanes are trichlorohydrogensilane, triethoxyhydrogensilane, triacetoxyhydrogensilane, triphenoxyhydrogensilane and the like.

The cyanoalkylsilane products made by the process are represented by the formula:

$$NC(C_aH_{2a})SiX_3$$

where X is as previously defined, $C_aH_{2a}$ is a divalent alkane group, $a$ is an integer of at least 2 and NC— is interconnected to silicon through at least two carbon atoms of the divalent alkane group, $C_aH_{2a}$. Such cyanoalkylsilanes are illustrated by beta-cyanoethyltrichlorosilane, beta-cyanoethyltriethoxysilane, gamma-cyanopropyltrichlorosilane, beta-cyanopropyltriethoxysilane and the like. These cyanoalkylsilane products are useful in a variety of applications. They can be hydrolyzed and condensed to provide quick-curing resins useful in the manufacture of molded articles, protective coatings and laminates. The cyanoalkylchlorosilane products can be esterified with alkanols to provide the corresponding cyanoalkylalkoxysilanes which can be hydrogenated to give the corresponding aminoalkylalkoxysilanes. The aminoalkylalkoxysilanes are particularly useful as protective coatings for metal articles when applied to and cured on the surface of such articles.

One particular advantage of the use of silyl amine catalysts in accordance with this invention is the ease with which catalyst contamination of the product can be avoided. The silyl amines employed as catalysts herein are easily removed by esterification with an alcohol or by hydrolysis to convert the silyl amine into a low boiling silylalkoxide or silanol by cleavage of the Si—N bond and stripping the low boiling material from the product. In many applications the removal of the silyl amine catalyst is accomplished during the use of the cyanoalkylsilanes and no additional steps need be taken for catalyst removal. For example, when esterifying cyanoalkylchlorosilanes to the corresponding cyanoalkylalkoxysilanes the silyl amine catalyst is removed in the ordinary course of the esterification. In many other applications the presence of the silyl amine catalyst in the cyanoalkylsilane products is not at all objectionable.

The following examples are presented. In these examples 1 weight percent of "Ionol" (a hindered phenol designated as 2,6-di-tertiary-butyl-4-methyl phenol) based on the combined weight of acrylonitrile and trichlorosilane was added to the reaction mixture to inhibit the polymerization of acrylonitrile. Although hindered phenols have previously been shown to catalyze the reaction of acrylonitrile and trichlorosilane to form beta-cyanoethyltrichlorosilane, the yields of beta-cyanoethyltrichlorosilane herein obtained are far superior to yields obtained by processes wherein hindered phenols alone are employed without any tertiary silylamine. The "Ionol" inhibitor in the following examples is non-essential for obtaining high yields of beta-cyanoethyltrichlorosilane, the silyl amine being indispensable.

*Example 1*

Into a 300 cubic centimeter stainless steel pressure vessel were charged acrylonitrile and trichlorosilane ($HSiCl_3$) in a one to one molar ratio, 1 weight percent of "Ionol" and 2 weight percent of N-(m-chlorophenyl)-aminotrimethylsilane,

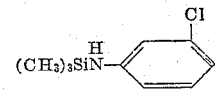

weight percents being based on combined weights of acrylonitrile and trichlorosilane. The vessel was sealed and heated in a rocking furnace at 150° C. for 1 hour. After 1 hour at 150° C. the vessel was cooled and discharged of its liquid contents. The liquid contents were distilled through a Vigreaux column to give 43 weight percent of beta-cyanoethyltrichlorosilane based on the combined weights of acrylonitrile and trichlorosilane initially charged and 20 weight percent of heavies on the same weight basis.

*Example 2*

Into a 300 cubic centimeter stainless steel pressure vessel were charged acrylonitrile and trichlorosilane ($HSiCl_3$) in a one to one molar ratio, 1 weight percent of "Ionol" and 2 weight percent of N-hexylaminotrimethylsilane, $(CH_3)_3SiNH(CH_2)_5CH_3$, weight percent being based on combined weights of acrylonitrile and trichlorosilane. The vessel was sealed and heated in a rocking furnace at 150° C. for 1 hour. After 1 hour at 150° C. the vessel was cooled and discharged of its liquid contents. The liquid contents were distilled through a Vigreaux to give 34.8 weight percent of beta-cyanoethyltrichlorosilane based on the combined weights of acrylonitrile and trichlorosilane initially charged and 16.5 percent of heavies on the same weight basis.

In procedures similar to those described in Examples 1 and 2 the following silyl amine catalysts can be employed as catalysts in reacting trichlorosilane and acrylonitrile to produce beta-cyanoethyltrichlorosilane in high yields: trimethylsilylamine, bis(N-chloropropylamino)-diphenylsilane, tris(N-phenylamino)ethylsilane, tetra(N-ethylamino)silane, bis(N-chlorophenylamino)diethoxysilane, propylaminotriethoxysilane and triethoxysilylamine.

What is claimed is:

1. A process for preparing a cyanoalkylsilane wherein the cyano group is interconnected to silicon through at least two carbon atoms, which comprises reacting an alkene nitrile with a silane having one silicon-bonded hydrogen atom and three silicon-bonded hydrolyzable groups selected from the class consisting of alkoxy groups, aryloxy groups, acetoxy groups and halogen in the presence of a silyl amine catalyst of the formula:

$$R'_{4-y}Si(NHR)_y$$

where R' is selected from the class consisting of alkyl groups and aryl groups and an alkoxy group, R is selected from the class consisting of hydrogen, alkyl groups, chloroalkyl groups, aryl groups and chloroaryl groups, and $y$ is an integer of 1 to 4.

2. A process as claimed in claim 1 wherein the alkene nitrile is acrylonitrile and the silane is trichlorosilane.

3. A process for preparing a cyanoalkylsilane wherein the cyano group is interconnected to silicon through at least two carbon atoms, which comprises reacting an alkene nitrile with a silane having one silicon-bonded hydrogen atom and three silicon-bonded hydrolyzable groups selected from the class consisting of alkoxy groups, aryloxy groups, acetoxy groups and halogen in the presence of an N-alkylaminotrialkylsilane.

4. A process for preparing a cyanoalkylsilane wherein the cyano group is interconnected to silicon through at least two carbon atoms, which comprises reacting an alkene nitrile with a silane having one silicon-bonded hydrogen atom and three silicon-bonded hydrolyzable groups selected from the class consisting of alkoxy groups, aryloxy groups, acetoxy groups and halogen in the presence of an N-chloroarylaminotrialkylsilane.

5. A process for preparing beta-cyanoethyltrichlorosilane which comprises reacting acrylonitrile with trichlorosilane in the presence of N-(m-chlorophenyl)-aminotrimethylsilane.

6. A process for preparing beta-cyanoethyltrichlorosilane which comprises reacting acrylonitrile with trichlorosilane in the presence of N-hexylaminotrimethylsilane.

References Cited in the file of this patent
UNITED STATES PATENTS

| | | |
|---|---|---|
| 2,716,638 | Cohen et al. | Aug. 30, 1955 |
| 2,900,363 | Bluestein | Aug. 18, 1959 |